United States Patent
Thomas et al.

(10) Patent No.: US 7,559,531 B2
(45) Date of Patent: Jul. 14, 2009

(54) LOW TORQUE BALL VALVE WITH DYNAMIC SEALING

(75) Inventors: Kurt R. Thomas, Durand, IL (US); Eugene R. Jornod, Roscoe, IL (US)

(73) Assignee: TAC, LLC, Loves Park, IL (US)

( * ) Notice: Subject to any disclaimer, the term of this patent is extended or adjusted under 35 U.S.C. 154(b) by 105 days.

(21) Appl. No.: 11/564,904

(22) Filed: Nov. 30, 2006

(65) Prior Publication Data

US 2008/0128648 A1    Jun. 5, 2008

(51) Int. Cl.
*F16K 25/00* (2006.01)
(52) U.S. Cl. ............ 251/185; 251/180; 251/192; 251/314
(58) Field of Classification Search .......... 251/175, 251/176, 180, 185, 192, 315.01, 314
See application file for complete search history.

(56) References Cited

U.S. PATENT DOCUMENTS

| | | | | |
|---|---|---|---|---|
| 3,667,727 A | * | 6/1972 | Bowden | ............ 251/172 |
| 4,061,307 A | | 12/1977 | Yoshiike et al. | |
| 4,071,220 A | | 1/1978 | Iino | |
| 4,318,420 A | * | 3/1982 | Calvert | ............ 137/74 |
| 4,477,055 A | * | 10/1984 | Partridge | ............ 251/174 |
| 5,482,249 A | * | 1/1996 | Schafbuch et al. | ...... 251/118 |
| 6,039,304 A | | 3/2000 | Carlson et al. | |
| 6,533,241 B1 | | 3/2003 | Chen | |
| 6,948,699 B1 | | 9/2005 | Keiser | |

FOREIGN PATENT DOCUMENTS

WO    WO 01/38761    5/2001

\* cited by examiner

*Primary Examiner*—John K Fristoe, Jr.
(74) *Attorney, Agent, or Firm*—Reinhart Boerner Van Deuren P.C.

(57) ABSTRACT

A ball valve having reduced torque requirements for rotation is presented. Torque reduction is realized by providing a shaped sealing back member to provide a back force behind essentially the entire sealing surface of the downstream seal. Torque reduction is also realized by providing a dynamic sealing configuration that varies the sealing force over the valve's operating pressure conditions. An initial bias sealing force is applied by a spring member which also provides a low uniform as-assembled valve torque. As fluid pressure increases, the sealing pressure also increases as an o-ring is forced along a ramped surface of the seal. As inlet pressure decreases, the o-ring is allowed to back down the ramped surface to reduce the sealing force against the valve member. This sealing configuration allows for reverse flow or improper installation of the ball valve, and bottoms out to maintain a sealing force at higher back pressure conditions.

20 Claims, 1 Drawing Sheet

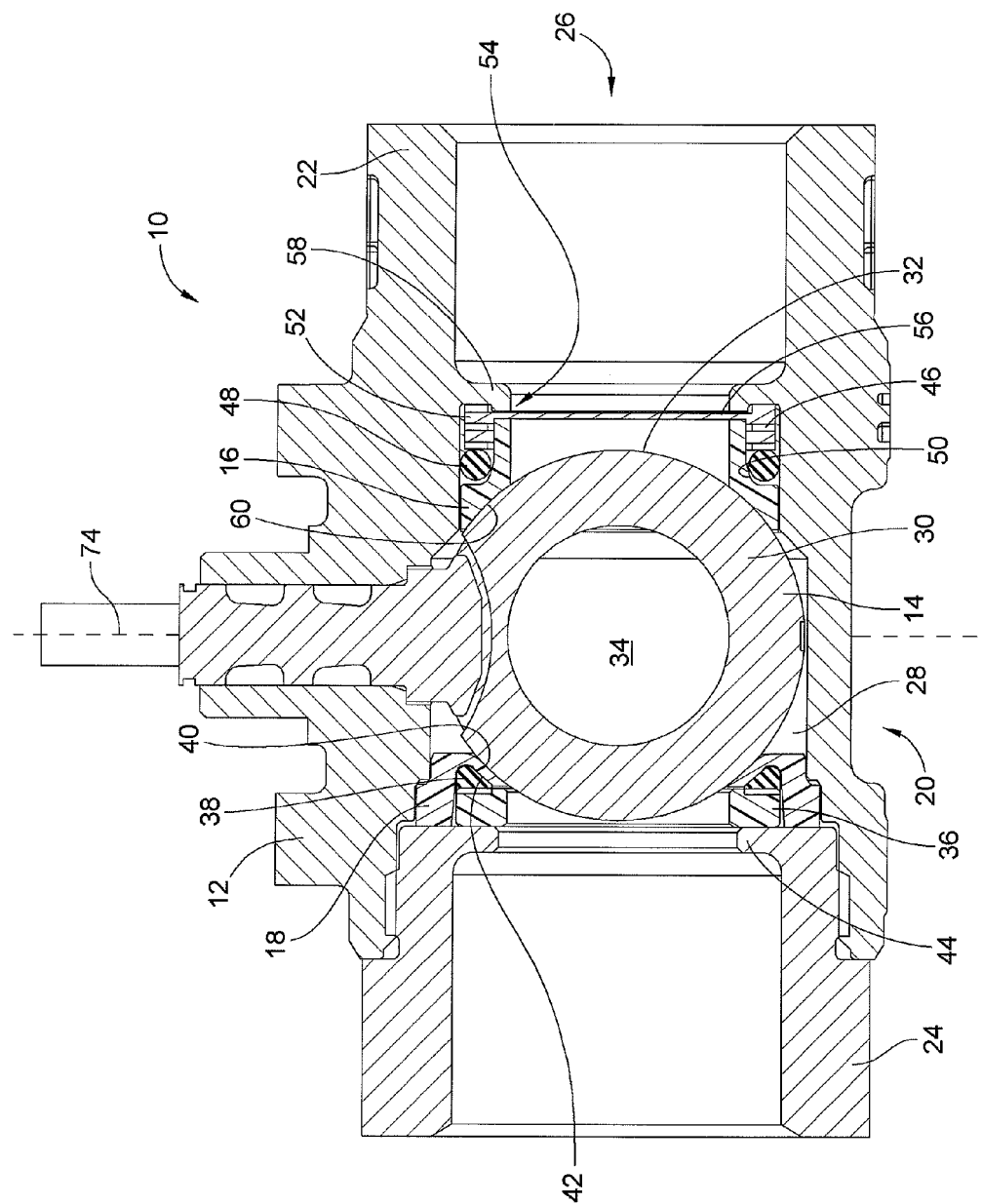

LOW TORQUE BALL VALVE WITH DYNAMIC SEALING

FIELD OF THE INVENTION

This invention relates to ball valves, and more particularly to an apparatus and method for dynamically sealing the valve member of a ball valve to allow for a reduction of the torque required for turning the valve member of such a ball valve.

BACKGROUND OF THE INVENTION

It is generally advantageous to reduce the torque required for repositioning the valve member in a ball valve. This is especially true for ball valves having an actuator motor connected to the valve member for repositioning the valve member, because lowering the torque requirement will allow a smaller actuator to be utilized. Generally speaking, smaller actuators can be produced at lower cost than larger actuators, and require less input power, thereby reducing both the initial cost and the operating cost of the actuator.

Typical ball valves have a valve body and a valve member operatively connected to the valve body by an upstream and a downstream seal. The valve body defines a flow passage having an upstream flow-through end, a downstream flow-through end, and a valve receiving chamber located between the upstream and downstream flow-through ends of the flow passage. The valve member is located within the valve receiving chamber, and includes a throughbore that allows passage of fluid through the valve member. The seals, in conjunction with the valve member and the valve receiving chamber, define a cavity around the valve member. To prevent leakage of the valve, the seals are pressed against the valve member with a given or fixed sealing pressure based, at least in part, on the maximum pressure environment in which the valve may be installed.

The valve member is coupled to an actuator via a valve stem, which is selectively rotatable to rotate the valve member within the valve receiving chamber, between a fully open position and a fully closed position. Generally, in a two way valve, the fully open position occurs when the throughbore is perfectly aligned with the flow passage at zero degrees of rotation from a centerline of the flow passage, and the fully closed position occurs at ninety degrees of rotation of the valve member from the centerline.

There are several different reasons why ball valves experience high torque during their operation or after being assembled. One such reason results from the sealing configuration employed in the typical ball valves. As discussed above, to prevent leakage of the valve, the upstream and downstream seals are biased against the valve member at a given pressure, typically based on the maximum pressure in which the valve may be installed. The actuator, therefore, must be able to rotate the valve member against such sealing pressure applied by the upstream and downstream seals, at a minimum. This drives a minimum size for the actuator, regardless of the actual pressures in which the valve is actually installed. That is, the sealing pressure is roughly fixed against a maximum possible fluid pressure, even if the actual fluid pressure of the installation is much less.

High torque may also be experienced once the valve is assembled and before it is placed in service as mentioned above. This is because typical valve products rely on manufacturing processes that are imperfect. Variances in machining the valve, for example, can cause valves to have extremely high torques after assembly or low torques after assembly. Manufactures typically over-size actuators to overcome these high-torque conditions caused by manufacturing tolerances or variances.

High torque may also be encountered every time the valve member is repositioned to or from a fully closed position of the valve, due to inherent operational characteristics of a ball valve. When the valve is closing from the open position, the valve member typically requires 13 degrees of additional rotation, past the point at which the throughbore in the valve member is no longer even partly aligned with the flow passage, in order for the valve member to reach the fully closed position. This additional rotation moves the throughbore far enough past the upstream seal, to preclude any leakage past the seal and into the throughbore. For example, if the valve is fully open at 0 degrees, the valve starts to close (i.e. the throughbore rotates past the seal) at 77 degrees, and is fully closed at 90 degrees. As the throughbore rotates past the seal at 77 degrees, the valve close-off pressure starts to rise toward a high pressure, of for example 10-50 pounds per square inch generally found in a typical heating and cooling system installation.

The valve member also typically requires 13 degrees of rotation, from the point at which the valve starts to rotate out of the fully closed position, before the throughbore begins to be partly exposed to the flow passage, such that if the valve is fully closed at 90 degrees, the valve starts to open at 77 degrees, and is fully open at 0 degrees. Before the valve starts to open, between 90 and 77 degrees, the valve member is exposed to and must rotate against the full close-off pressure, of for example 10-50 pounds per square inch in a typical heating and cooling system installation.

For prior ball valves, the high close-off pressure pushes the ball constantly against the downstream seal when the valve is closed, and throughout the 13 degrees of rotation just after closing and just before opening. This results in a high compression force against the downstream seal, which creates high dynamic friction between the downstream seal and the valve member, and also generates significant elastic deformation of the relatively soft material of the downstream seal. The high dynamic friction created by this inherent characteristic of prior traditional ball valves results in the actuator having to generate high rotational torque to rotate the ball through the 13 degrees just after the valve closes, or the 13 degrees of rotation just before the valve opens.

Additionally, when the valve member is partially open the edge of the throughbore will press into the downstream seal at two positions, resulting in a deformation or indentation along these two contact areas. These indentations or deformations also substantially increase the torque required to reposition the valve member.

In addition, when the valve is closed, and stays closed while exposed to high close-off fluid pressure for the long period time, the high close-off pressure fluid pushes the valve member constantly against the downstream seal. This results in a high compression force that creates a high static friction between the downstream seal and the valve member, and also causes significant deformation of the soft material used for the seal, due to the low compressive strength of such seal materials. These conditions individually and in combination significantly increase static and dynamic friction between the seals and the valve member, requiring that the actuator generate an undesirably high breakaway torque to break loose and reposition the valve member.

In order for the actuators of prior ball valves to have enough torque to overcome the high breakaway torque, high static and dynamic friction, and other factors as discussed above, it has been necessary in the past to over-size the actuator, so that it will be able to provide sufficient torque to break the valve member loose and reposition it, under any of the operating conditions described above. This has required that the actuators in prior ball valves be physically larger and heavier, more costly, and consume more power during operation than would be the case if the inherently high torques encountered in prior ball valves could be reduced, especially under the operating conditions described above.

There is a need in the art, therefore, for a ball valve and a sealing configuration that overcomes these and other problems existing in the art. The apparatus and method of the present invention provides such a ball valve and dynamic sealing configuration.

BRIEF SUMMARY OF THE INVENTION

Embodiments of invention provide an apparatus and method for reducing the torque required for repositioning a valve member of a ball valve, and to ball valves incorporating same.

The invention is applicable to ball valves having a valve body, and a valve member operatively connected to the valve body by an upstream and a downstream seal. The valve body defines a flow passage having an upstream flow-through end thereof, a downstream flow-through end thereof, and a valve receiving chamber therebetween. The valve member is disposed within the valve receiving chamber and includes a throughbore therein. The valve member is selectively rotatable about an axis within the valve receiving chamber between an open and a closed position, with the open position providing flow-through alignment of the throughbore in the valve member with the upstream and downstream flow-through ends of the valve body, and the closed position being out of flow-through alignment of the throughbore of the valve element with the upstream and downstream flow-through ends of the valve body. The upstream and a downstream seals operatively connect the valve member to the valve body, at upstream and downstream ends, respectively, of the valve receiving chamber.

In one embodiment of the present invention, to overcome the increased torque that results from the deformation and indentations in the downstream seal during various operating conditions as discussed above, a resilient, shaped member is utilized behind the downstream seal to provide a substantially uniform counter force across the sealing face of the downstream seal. In one embodiment a shaped rubber member providing a contact surface along substantially all of the back of the sealing face of the downstream seal is provided to minimize the downstream seal deformation and indentations that result in prior ball valve downstream seal designs. In an alternate embodiment, this same shaped back member may be used to provide the same substantially uniform back or counter force along substantially the entire sealing face of the upstream seal as well. In one embodiment the sealing member is Teflon and the shaped sealing back member is rubber.

In one embodiment to the present invention, the upstream seal for the ball valve provides dynamic sealing against the valve member. This is accomplished in one embodiment by providing a spring force to bias the sealing member against the valve member, while allowing for a variable sealing force thereagainst under different operating pressures. To ensure that the upstream sealing member maintains the seal under higher fluid pressure conditions, the upstream sealing member includes a ramped surface and an o-ring behind the sealing face of the upstream seal member. The upstream seal member is configured to allow the o-ring to be in fluid communication with the inlet pressure of the valve. As the inlet pressure increases, the o-ring is biased toward the valve member and, acting on the ramped surface of the upstream seal member, results in a dynamic increase in sealing pressure under increased fluid pressure conditions. As the inlet pressure decreases, the o-ring is allowed to move along the ramped surface away from the valve member. This reduces the pressure of the seal on the valve member, thereby allowing for a reduced torque to rotate the valve member.

Other aspects, objectives and advantages of the invention will be apparent from the following detailed description and the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a cross section of a first exemplary embodiment of a ball valve having dynamic sealing, according to one embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIG. 1 shows a first exemplary embodiment of a ball valve 10, according to the invention. The ball valve 10 includes a valve body 12, and a valve member 14 operatively connected to the valve body 12 by an upstream and a downstream seal 16, 18.

The valve body 12 includes a central section 20, an upstream flow-through end 22, and a downstream flow-through end 24. The upstream and downstream flow-through ends 22, 24 are threadably joined to the central section 20, to form the valve body 12, and defines a flow passage 26 having an inlet formed by the upstream flow-through end 22, an outlet formed by the downstream flow-through end 24, and a valve receiving chamber 28 disposed between the upstream and downstream flow-through ends 22, 24.

The valve member 14 of the exemplary embodiment has an outer wall 30 defining a generally spherical shaped outer surface 32, and includes a throughbore 34 therein. The valve member 14 is disposed within the valve receiving chamber 28 of the valve body 12.

The valve member 14 is selectively rotatable about an axis 74 within the valve receiving chamber 28, between an open position, not shown, and a closed position, as shown in FIG. 1. In the open position, the throughbore 34 of the valve member is aligned in a flow-through alignment with the upstream and downstream flow-through ends 22, 24 of the valve body 12. In the closed position, the throughbore 34 is positioned in an out of flow-through alignment with the upstream and downstream flow-through ends 22, 24, to thereby block a flow of fluid through the ball valve 10.

The valve element 14 is operatively connected to the valve body 12 by the upstream and a downstream seals 16, 18. The upstream and downstream seals 16, 18 are clamped in sealing contact with the spherical outer surface 32 of the valve element 14, by the upstream and downstream flow-through ends 22, 24 of the valve body 12, at upstream and downstream ends, respectively, of the valve receiving chamber 28.

In one embodiment to the present invention, a flow control disk 36 may be utilized to control the fluid flow through the valve 10 as the valve member 14 is being rotated from the closed to the open position. Various configurations for the flow control disk may be used, such as for example the flow characterizing device described in U.S. Pat. No. 7,111,643 entitled "Flow Characterization in a Flow Path", assigned to the assignee of the present application. Those skilled in the art will recognize, however, that other flow characterizing inserts or flow control disks may be used depending on the flow characteristics desired from the ball valve 10. Indeed, in an alternate embodiment, the flow control disk 36 is eliminated and the downstream flow-through end 24 provides the sealing force on the downstream seal 18.

To reduce the deformations and/or indentations that can occur in the downstream seal 18 as discussed above, an embodiment of the present invention provides a shaped sealing back member 38 positioned behind the downstream seal 18. This shaped sealing back member 38 provides pressure along substantially all of the back surface 42 of sealing face 40 of the downstream seal 18 that is in contact with the outer surface 32 of the valve member 14. The pressure applied across the back surface 42 of face 40 of the downstream seal 18 reduces the likelihood of the sealing face 40 being deformed or indented by the valve member 14 as discussed above.

Such prior deformations or indentations were allowed, at least in part, because a conventional o-ring was typically used behind the sealing face of the downstream seal. The radial outer surface of the o-ring did not provide a back force against the entire surface area of the downstream seal, and therefore allowed deformation, and leakage at the seal, particularly in areas where the o-ring did not contact the downstream seal. By providing the shaped sealing back member 38, which supports substantially the entire back surface 42 of the downstream seal 18, deformations and indentations, and therefore leakage are much less likely to occur. This greatly reduces the amount of torque that would otherwise be necessary to overcome rotation of the valve member 14.

In an embodiment of the present invention that does not include the flow control disk 36, the shaped sealing back member 38 may be sized to extend to contact the shoulder 44 of the flow-through end 24 to provide the appropriate sealing force along the surface 40 of the downstream seal 18. Alternatively, the shoulder 44 of flow-through end 24 may be configured to extend toward the receiving chamber 28 so as to engage the shaped sealing back member 38.

While the embodiment illustrated in FIG. 1 includes the above-described sealing configuration only for the downstream seal, those skilled in the art in view of the foregoing description will realize that incorporation of the same structure for the upstream seal will also provide distinct advantages over prior sealing configurations. Therefore, embodiments of the present invention that utilize this sealing configuration for both the upstream and downstream seals, or for the upstream seal alone, are included in the scope of the present invention.

Returning to the embodiment illustrated in FIG. 1, the configuration of the upstream seal 16 provides for a dynamic sealing configuration against the valve member 14, and thereby greatly reduces the torque required to rotate the valve member 14 during operation thereof. Specifically, while prior sealing configurations provided a static sealing force against the valve member dictated by the friction fit against the valve member caused by the assembly of the valve itself, i.e., by the crushing force that resulted when the flow-through member 24 was installed, the seal 16 provides a dynamic sealing force against the valve member 14.

This dynamic sealing force is determined initially by the force applied by spring 46 which biases o-ring 48 toward the ramped back surface 50 of seal member 16. This spring 46 may be a spring, wave washer, etc. that provides a resilient biasing force on o-ring 48. With this configuration, the initial frictional force applied by the seals on the ball member 14 may be less than typically required in the construction of prior static seals for a ball valve, which sealing force was dictated by the maximum pressure conditions that the ball valve might experience in operation. As such, this lower sealing force allows the valve member 14 to be rotated more easily, thereby allowing a smaller actuator to be used to actuate the valve 10.

The dynamic sealing force against valve member 14 by the upstream seal 16 may be increased as the inlet pressure increases to prevent leakage of the ball valve in such higher pressure installations or operating modes. This dynamic sealing force is enabled by allowing the higher pressure fluid to enter a dynamic sealing chamber 52 through a gap 54 defined between the end 56 of the seal 16 and the shoulder 58 of flow-through end 22. As the pressure in the chamber 52 increases, it forces the o-ring 48 along the ramped surface 50 of seal 16, thereby increasing the sealing pressure on the outer surface 32 of valve member 14. As the inlet pressure reduces, the pressure in chamber 52 decreases, thereby allowing the o-ring 48 to move away from or down the ramped surface 50 away from the sealing surface 60 of the seal 16. This reduces the sealing force on surface 32 of member 14 and allows a reduced torque to rotate the valve member 14. This wedging and de-wedging action of the o-ring 48 under variable inlet pressure conditions provides dynamic sealing against the valve member 14, and all o-ring sealing surfaces at a level appropriate to maintain the seal without requiring high torque to rotate valve member 14 under all other conditions.

The configuration of seal 16 in relation to shoulder 58 of flow through member 22 also allows for some movement of the valve member 14 toward the inlet, which also allowing for dynamic sealing force to be applied in a back flow or back pressure condition. That is, if the outlet pressure rises or if there is a backward flow of fluid, the valve member may be forced by the outlet pressure toward the inlet. Such movement is facilitated with a dynamic increase in sealing force as the seal 16 is pushed backward toward shoulder 58. As this movement occurs, the spring force applied by spring 46 against o-ring 48 along the ramped surface 50 of seal 16 will increase the sealing force on the valve member 14. Further movement of the valve member 14 will be precluded once the end 56 of seal 16 bottoms out or contacts the shoulder 58 of flow through member 22. Any further increase in the outlet pressure will result in an increased friction seal on sealing surface 60 of seal 16 that will prevent any leakage due to this backward pressure or reverse flow condition. This allows the ball valve 10 of an embodiment of the present invention to support bi-directional flow installations and mistakenly backward installations without the leakage problem encountered with prior ball valves, check-valve type valves, or balance ball valves with one sealing surface.

While the embodiment illustrated in FIG. 1 only utilizes the dynamic sealing configuration for seal 16 on the inlet side of valve member 14, those skilled in the art will recognize from the foregoing description that such a dynamic sealing arrangement may be utilized on a downstream end of the valve member 14, alone or in combination with this dynamic sealing arrangement on both the upstream and downstream side of valve member 14.

Those having skill in the art will also recognize that, although invention has been described herein with reference to several exemplary embodiments, many other embodiments of the invention are possible. For example, although all of the exemplary embodiments described herein utilize a valve element having a spherical outer surface 32, the invention may also be practiced to advantage in ball valves having non-spherical shaped valve elements.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A ball valve, comprising:

a valve body defining a flow passage having an upstream flow-through end thereof, a downstream flow-through end thereof and a valve receiving chamber therebetween;

a valve member disposed within the valve receiving chamber and having a throughbore therein, the valve member being selectively movable within the valve receiving chamber between an open and a closed position, the open position providing flow-through alignment of the throughbore with the upstream and downstream flow-through ends of the valve body, and the closed position providing an out of flow-through alignment of the throughbore with the upstream and downstream flow-through ends of the valve body for blocking flow through the flow passage; and an upstream seal and a downstream seal operatively connecting the valve member to the valve body at upstream and downstream ends respectively of the valve receiving chamber; and wherein at least the upstream seal includes a spring member positioned between the upstream flow-through end and the upstream seal to provide a bias sealing force against the valve member;

wherein at least the upstream seal further includes an o-ring interposed between the spring member and the upstream seal;

wherein at least the upstream seal includes a ramped back surface, wherein the ramped back surface and the valve receiving chamber form a dynamic sealing chamber, and wherein the o-ring and the spring member are accommodated in the dynamic sealing chamber; and wherein the o-ring is moved along the ramped back surface upon an increase in pressure in the dynamic sealing chamber to increase a sealing pressure on the valve member.

2. The ball valve of claim 1, wherein the downstream seal includes a downstream spring member positioned between the downstream flow-through end and the downstream seal to provide a bias sealing force against the valve member.

3. A ball valve, comprising:

a valve body defining a flow passage having an upstream flow-through end thereof, a downstream flow-through end thereof and a valve receiving chamber therebetween;

a valve member disposed within the valve receiving chamber and having a throughbore therein, the valve member being selectively movable within the valve receiving chamber between an open and a closed position, the open position providing flow-through alignment of the throughbore with the upstream and downstream flow-through ends of the valve body, and the closed position providing an out of flow-through alignment of the throughbore with the upstream and downstream flow-through ends of the valve body for blocking flow through the flow passage; and an upstream seal and a downstream seal operatively connecting the valve member to the valve body at upstream and downstream ends respectively of the valve receiving chamber;

wherein at least the upstream seal includes a spring member positioned between the upstream flow-through end and the upstream seal to provide a bias sealing force against the valve member; and wherein at least the upstream seal further includes an o-ring interposed between the spring member and the upstream seal, the spring member operably axially acting on the o-ring such that the bias sealing force provided by the spring member against the valve member is transferred through the o-ring.

4. The ball valve of claim 3, wherein at least the upstream seal includes a ramped back surface, wherein the ramped back surface and the valve receiving chamber form a dynamic sealing chamber, and wherein the o-ring and the spring member are accommodated in the dynamic sealing chamber.

5. The ball valve of claim 4, wherein at least the upstream flow-through end includes a shoulder, and wherein the spring member biases at least the upstream seal away from the shoulder in a quiescent state thereby defining a gap therebetween allowing the dynamic sealing chamber to be in fluid communication with the upstream flow-through end.

6. The ball valve of claim 5, wherein the o-ring and the ramped back surface are configured to increase a sealing pressure on the valve member upon an increase in pressure in the upstream flow-through end.

7. The ball valve of claim 5, wherein movement of the valve member toward the upstream flow-through end is facilitated by the gap.

8. The ball valve of claim 7, wherein the spring member increases a bias force on the o-ring to thereby increase a sealing pressure on the valve member upon movement of the valve member toward the upstream flow-through end.

9. The ball valve of claim 8, wherein further movement of the valve member toward the upstream flow-through end is impeded by the upstream seal when it contacts the shoulder.

10. A ball valve, comprising:
a valve body defining a flow passage having an upstream flow-through end thereof, a downstream flow-through end thereof and a valve receiving chamber therebetween;
a valve member disposed within the valve receiving chamber and having a throughbore therein, the valve member being selectively movable within the valve receiving chamber between an open and a closed position, the open position providing flow-through alignment of the throughbore with the upstream and downstream flow-through ends of the valve body, and the closed position providing an out of flow-through alignment of the throughbore with the upstream and downstream flow-through ends of the valve body for blocking flow through the flow passage; and
an upstream seal and a downstream seal operatively connecting the valve member to the valve body at upstream and downstream ends respectively of the valve receiving chamber;
wherein at least the upstream seal includes a spring member positioned between the upstream flow-through end and the upstream seal to provide a bias sealing force against the valve member;
wherein at least the upstream seal further includes an o-ring interposed between the spring member and the upstream seal;
wherein at least the upstream seal includes a ramped back surface, wherein the ramped back surface and the valve receiving chamber form a dynamic sealing chamber, and wherein the o-ring and the spring member are accommodated in the dynamic sealing chamber;
wherein at least the upstream flow-through end includes a shoulder, and wherein the spring member biases at least the upstream seal away from the shoulder in a quiescent state thereby defining a gap therebetween allowing the dynamic sealing chamber to be in fluid communication with the upstream flow-through end; and
wherein the o-ring is moved along the ramped back surface upon an increase in pressure in the dynamic sealing chamber to increase a sealing pressure on the valve member.

11. A ball valve, comprising:
a valve body defining a flow passage having an upstream flow-through end thereof, a downstream flow-through end thereof and a valve receiving chamber therebetween;
a valve member disposed within the valve receiving chamber and having a throughbore therein, the valve member being selectively movable within the valve receiving chamber between an open and a closed position, the open position providing flow-through alignment of the throughbore with the upstream and downstream flow-through ends of the valve body, and the closed position providing an out of flow-through alignment of the throughbore with the upstream and downstream flow-through ends of the valve body for blocking flow through the flow passage; and
an upstream seal and a downstream seal operatively connecting the valve member to the valve body at upstream and downstream ends respectively of the valve receiving chamber; and
wherein at least the upstream seal includes a spring member positioned between the upstream flow-through end and the upstream seal to provide a bias sealing force against the valve member; and
wherein the downstream seal includes a shaped sealing back member positioned between the downstream flow-through end and the downstream seal, the shaped sealing back member having a contact surface directly contacting substantially all of a back surface of the downstream seal, the contact surface having a same profile as the back surface of the downstream seal.

12. The ball valve of claim 11, further comprising a flow control disk interposed between the shaped sealing back member and the downstream flow-through end.

13. A ball valve, comprising:
a valve body defining a flow passage having an upstream flow-through end thereof, a downstream flow-through end thereof and a valve receiving chamber therebetween;
a valve member disposed within the valve receiving chamber and having a throughbore therein, the valve member being selectively movable within the valve receiving chamber between an open and a closed position, the open position providing flow-through alignment of the throughbore with the upstream and downstream flow-through ends of the valve body, and the closed position providing an out of flow-through alignment of the throughbore with the upstream and downstream flow-through ends of the valve body for blocking flow through the flow passage; and
an upstream seal and a downstream seal operatively connecting the valve member to the valve body at upstream and downstream ends respectively of the valve receiving chamber; and
wherein at least the downstream seal includes a shaped sealing back member positioned between the downstream flow-through end and the downstream seal, the shaped sealing back member having a contact surface directly contacting substantially all of a back surface of the downstream seal, the contact surface having a same profile as the back surface of the downstream seal.

14. The ball valve of claim 13, wherein the upstream seal includes a shaped sealing back member positioned between the upstream flow-through end and the upstream seal, the shaped sealing back member contacting substantially all of a back surface of the upstream seal.

15. The ball valve of claim 13, wherein the upstream seal includes an o-ring and a spring member positioned between the upstream flow-through end and the upstream seal to provide a bias sealing force against the valve member.

16. The ball valve of claim 15, wherein the upstream seal includes a ramped back surface configured to increase a sealing pressure on the valve member when the o-ring is biased toward the valve member.

17. The ball valve of claim 16, wherein the o-ring is in fluid communication with the upstream flow-through end, and wherein an increase in fluid pressure in the upstream flow-through end biases the o-ring toward the valve member thereby increasing the sealing pressure of the upstream seal on the valve member.

18. The ball valve of claim 16, wherein the upstream seal is sized to allow for movement of the valve member toward the upstream flow-through end a given distance, the upstream seal providing an increasing sealing pressure on the valve member as it moves toward the upstream flow-through end.

19. A ball valve, comprising:
a valve body;
a valve member disposed within the valve body; and
an upstream seal and a downstream seal operatively connecting the valve member to the valve body at upstream and downstream ends respectively; and
wherein at least one of the upstream seal or the downstream seal includes a spring member to provide a bias sealing force to the at least one of the upstream seal or the downstream seal against the valve member; and
wherein at least one of the upstream seal or the downstream seal includes a shaped sealing back member, the shaped sealing back member having a contact surface directly contacting a back surface of the at least one of the upstream seal or the downstream seal, the contact surface and the back surface having a mating profile such that contact surface contacts substantially all of the back surface of the at least one of the upstream seal or the downstream seal.

20. A ball valve, comprising:
a valve body;
a valve member disposed within the valve body; and
an upstream seal and a downstream seal operatively connecting the valve member to the valve body at upstream and downstream ends respectively; and
wherein at least one of the upstream seal or the downstream seal includes a spring member to provide a bias sealing force to the at least one of the upstream seal or the downstream seal against the valve member; and
wherein at least one of the upstream seal or the downstream seal includes a shaped sealing back member, the shaped sealing back member contacting substantially all of a back surface of the at least one of the upstream seal or the downstream seal;
wherein the valve body defines an inlet and an outlet, and wherein at least one of the upstream seal or the downstream seal further includes a ramped back surface and an o-ring in fluid communication with one of the inlet or the outlet, the ramped back surface configured to increase a sealing pressure on the valve member when the o-ring is biased toward the valve member and along the ramped back surface due to an increase in pressure in one of the inlet or the outlet.

* * * * *